United States Patent
Watson (10) Patent No.: US 7,469,916 B2
(45) Date of Patent: Dec. 30, 2008

(54) AUTOMATED DEPLOYABLE RUNNING BOARD

(75) Inventor: Brad E. Watson, Sharon (CA)

(73) Assignee: Magna International Inc., Aurora, Ontario (CA)

( * ) Notice: Subject to any disclaimer, the term of this patent is extended or adjusted under 35 U.S.C. 154(b) by 516 days.

(21) Appl. No.: 11/196,746

(22) Filed: Aug. 3, 2005

(65) Prior Publication Data

US 2006/0214386 A1 Sep. 28, 2006

Related U.S. Application Data (60) Provisional application No. 60/665,114, filed on Mar. 25, 2005.

(51) Int. Cl.
*B60R 3/02* (2006.01)
(52) U.S. Cl. .................................. 280/166; 280/163
(58) Field of Classification Search ................. 280/163, 280/164.1, 166, 169
See application file for complete search history.

(56) References Cited

U.S. PATENT DOCUMENTS

| | | | | |
|---|---|---|---|---|
| 3,229,993 | A * | 1/1966 | Riddle ...................... 280/166 |
| 4,185,849 | A * | 1/1980 | Jaeger ...................... 280/166 |
| 4,189,955 | A * | 2/1980 | Bishop ...................... 74/498 |
| 4,909,700 | A * | 3/1990 | Fontecchio et al. ......... 414/549 |
| 5,228,707 | A * | 7/1993 | Yoder ...................... 280/166 |
| 6,135,472 | A * | 10/2000 | Wilson et al. ............... 280/166 |
| 6,869,092 | B1 * | 3/2005 | Henn ....................... 280/166 |
| 6,880,843 | B1 * | 4/2005 | Greer, Jr. .................. 280/166 |
| 7,017,927 | B2 * | 3/2006 | Henderson et al. .......... 280/166 |
| 7,318,596 | B2 * | 1/2008 | Scheuring et al. ........... 280/166 |
| 2004/0174043 | A1 * | 9/2004 | Bradsen et al. ........... 296/180.1 |

* cited by examiner

*Primary Examiner*—Christopher P Ellis
*Assistant Examiner*—John D Walters
(74) *Attorney, Agent, or Firm*—Clark Hill PLC (57) ABSTRACT

Running board systems are provided. The running board systems employ a motorized drive system that includes a rack-and-pinion system that enables both linear and rotational movement of the running board member, for example, through the use of a pivot member cooperating with one end of the running board member and one end of an arm member. The running board systems are automated and selectively operable to assume deployed and stowed positions. The running board systems can be used in conjunction with various surfaces of a vehicle, such as an aesthetically preferred flush style mounting to the rocker outer sheet metal surface such as but not limited to being mounted underneath a side door sill.

39 Claims, 7 Drawing Sheets

AUTOMATED DEPLOYABLE RUNNING BOARD

CROSS-REFERENCE TO RELATED APPLICATION

The instant application claims priority to U.S. Provisional Patent Application Ser. No. 60/665,114, filed Mar. 25, 2005, the entire specification of which is expressly incorporated herein by reference.

FIELD OF THE INVENTION

The present invention relates generally to running board systems, and more specifically to automated running board systems that are selectively deployable and stowable, wherein the systems have a substantially small overall section height and can be deployed at a desired height and position relative to the vehicle and components thereof.

BACKGROUND OF THE INVENTION

A running board is typically a small ledge, step, or footboard, located beneath the doors of an automobile, to assist passengers entering or leaving the car. Running boards are typically employed on larger vehicles, such as minivans, sport utility vehicles, trucks, and/or the like, where passengers may need assistance entering and exiting the vehicle; however, they can also be employed with relatively smaller sedans and coupes, as well.

Recently, there has been increased interest by automotive manufacturers in the use of automated running board systems that are selectively deployable and stowable. A problem associated with conventional automated running board systems is to design an extremely low-profile running board system that would provide a sufficient board length and width that deploys and retracts to a mid point between ground level and the top of door sill. For example, with very limited packaging space available under the side of vehicle (i.e., without infringement to underbody components) and minimum ground clearance locations, the challenge to automotive designers is to provide a running board system that is robust enough within a very small overall section height and provide the articulation required to deploy the running board assembly to the most ergonomic position for passenger ingress and egress.

Accordingly, there exists a need for new and improved automated running boards systems that are selectively deployable and stowable, such as those systems that have a substantially small overall section height and can be deployed at a desired height and position relative to the vehicle and components thereof.

SUMMARY OF THE INVENTION

It is an object of the present invention to provide new and improved automated running board systems, which obviates at least one disadvantage of the prior art.

In accordance with a first embodiment of the present invention, a selectively automated running board system that is deployable and stowable is provided, comprising: (1) a running board member; (2) a pivot member operably associated with a surface of the running board member; (3) an arm member operably associated a surface of the pivot member; and (4) a motion system operable to impart linear movement to the arm member, wherein the linear movement of the arm member is operable to impart rotational movement to the pivot assembly at either the start or end of a deployment or stowing operation of the running board system.

In accordance with a second embodiment of the present invention, a selectively automated running board system that is deployable and stowable is provided, comprising: (1) a running board member; (2) a pivot member operably associated with a surface of the running board member; (3) an arm member operably associated a surface of the pivot member; and (4) a rack and pinion system operable to impart linear inboard or outboard movement to the arm member, wherein the linear inboard or outboard movement of the arm member is operable to impart rotational movement to the pivot assembly at either the start or end of a deployment or stowing operation of the running board system.

In accordance with a third embodiment of the present invention, a selectively automated running board system that is deployable and stowable is provided, comprising: (1) a running board member; (2) a pivot member operably associated with a surface of the running board member; (3) an arm member operably associated a surface of the pivot member; (4) a sleeve member at least partially enveloping a portion of the arm member; (5) a friction member disposed between the arm member and the sleeve member; and (6) a motion system operable to impart linear movement to the arm member, wherein the friction member is operable to impart rotational movement to the pivot assembly at either the start or end of a deployment or stowing operation of the running board system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The same reference numerals refer to like elements in the various Figures.

DETAILED DESCRIPTION OF THE PREFERRED EMBODIMENTS

The following description of the preferred embodiment(s) is merely exemplary in nature and is in no way intended to limit the invention, its application, or uses.

The present invention provides a selectively deployable running board assembly that includes a relatively low profile height to mount, e.g., under a low clearance vehicle, as well as one that deploys approximately 5½ inches laterally and then tilts up at its stowed position to provide an essentially hidden appearance to the outer rocker area. This improves overall appearance, minimizes aerodynamic drag from the board assembly, and also reduces the gap between the top of the board and the door sill to eliminate snow and ice from collecting on the top of the board while driving with the unit stowed. This tilt and deploy/stow action necessitates an articulation mechanism which will be described in detail herein.

The present invention provides a synchronized dual linear drive mechanism which is bifunctional in that it provides linear motion and rotational motion at both ends of linear travel while using only one motor to accomplish this motion with dual rack and pinion drive assemblies.

More specifically, the present invention provides a linear drive mechanism that provides linear and rotational motion with rack and pinion linkage arrangements connected to support arms and end pivot assemblies connected to the running board.

Although the present invention will be described with primary application to side-mounted running board systems, it should be appreciated that the present invention can be practiced at any number of locations relative to a vehicle, such as but not limited to the rear portions, front portions, under-bumper locations, and/or the like.

Figure 1:
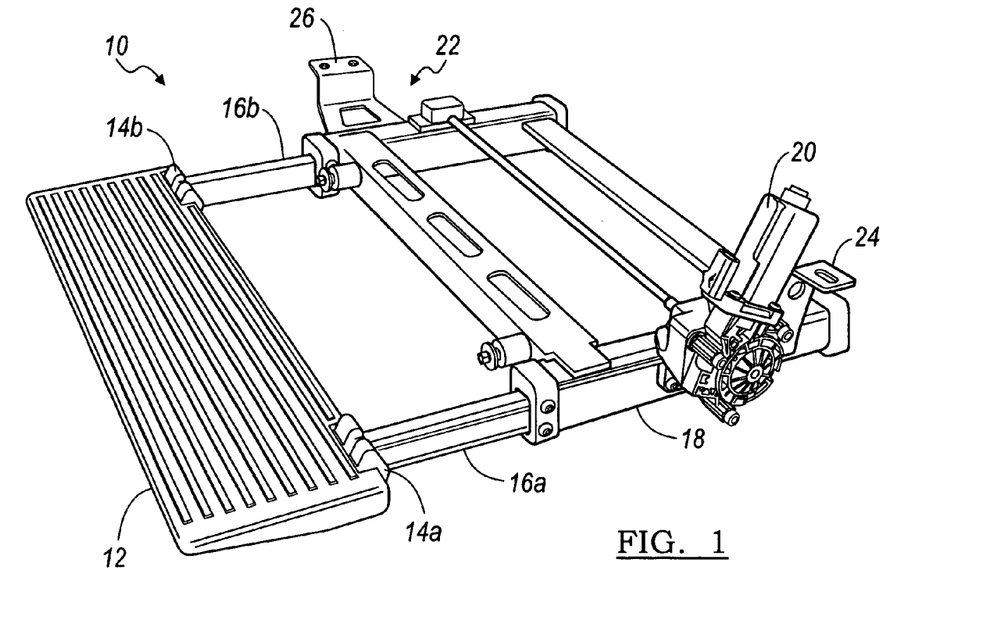
FIG. 1 is a perspective view of running board system in the deployed position, in accordance with a first embodiment of the present invention.

Referring to FIG. 1, there is shown a perspective view of running board system 10 (in this view, in the deployed position), in accordance with a first embodiment of the present invention.

The system 10 primarily includes a running board member 12, a pair of pivot assemblies 14a, 14b, respectively, operably associated with a side edge portion of the running board member 10 to impart rotational (e.g., vertical) movement thereto, a pair of arm assemblies 16a, 16b, respectively, operably associated with a portion of the pivot assemblies 14a, 14b, respectively, an optional housing 18 (either sealed or unsealed) operable to receive at least a portion of the arm assemblies 16a, 16b, respectively, and a motorized drive assembly 20 operable to impart linear (e.g., horizontal) movement to the arm assemblies 16a, 16b, respectively. An optional mounting system 22 is shown including mounting bracket members 24, 26, respectively, for mounting the system 10 to a surface of a vehicle. A slave drive assembly 28 is shown opposite the motorized drive assembly 20.

Figure 2:
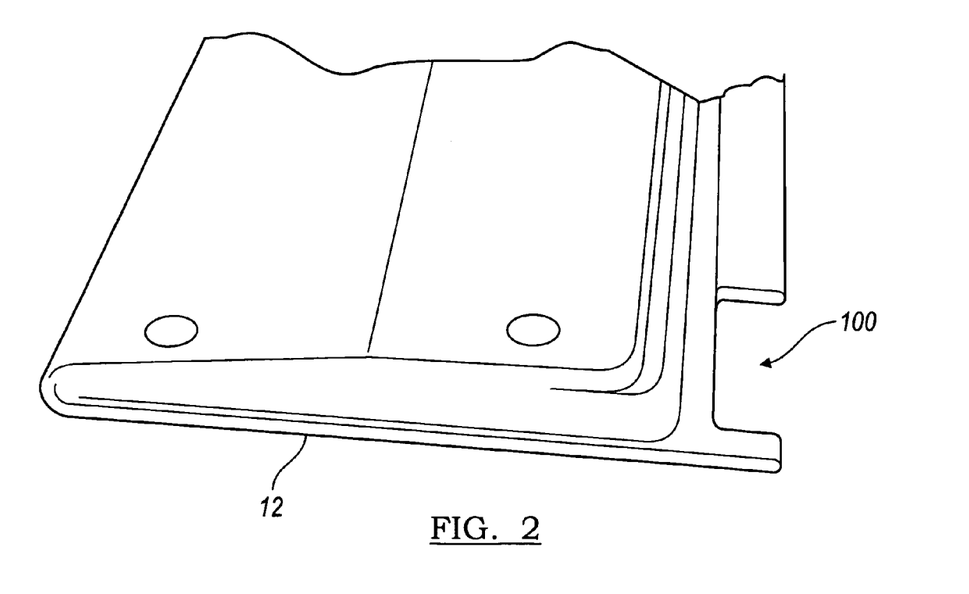
FIG. 2 is a perspective view of the running board member depicted in FIG. 1, in accordance with a second embodiment of the present invention.

Referring to FIG. 2, there is shown a perspective view of the running board member 12 depicted in FIG. 1, in accordance with a second embodiment of the present invention. The running board member 12 is shown as being substantially wedge-shaped, although it is envisioned that other configurations can be employed in the practice of the present invention. The running board member 12 is preferably provided with at least one area defining a notch 100, e.g., to receive a portion of the pivot assembly 14. It should be appreciated that a notch would be formed on two spaced portions of one side edge portion of the running board member 12 to receive a portion of the pivot assemblies 14a, 14b, respectively.

Figure 3:
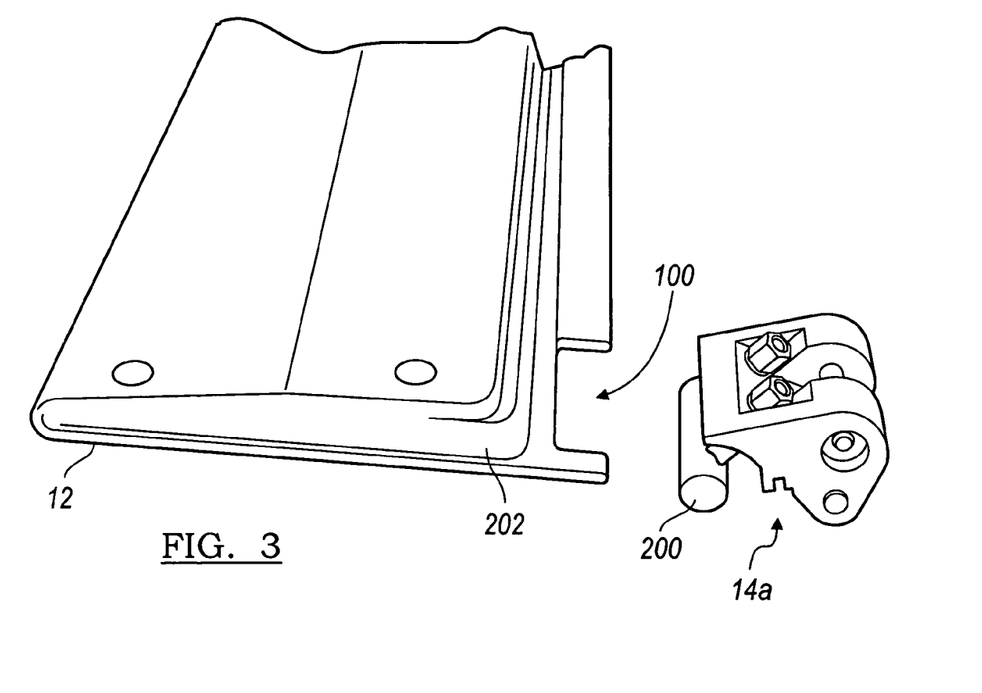
FIG. 3 is an exploded view of the running board member and one of the pivot assemblies depicted in FIG. 1, in accordance with a third embodiment of the present invention.

Referring to FIG. 3, there is shown an exploded view of the running board member 10 and one of the pivot assemblies 14a depicted in FIG. 1, in accordance with a third embodiment of the present invention. The pivot assembly 14a (as well as pivot assembly 14b) includes a tongue portion 200 that is operable to be received in a groove 202 formed in the running board member 12. A portion of the pivot assembly 14a is then received in the notch 100. In this manner, the running board member 12 is substantially rigidly fastened to the pivot assemblies 14a, 14b, respectively.

Figure 4:
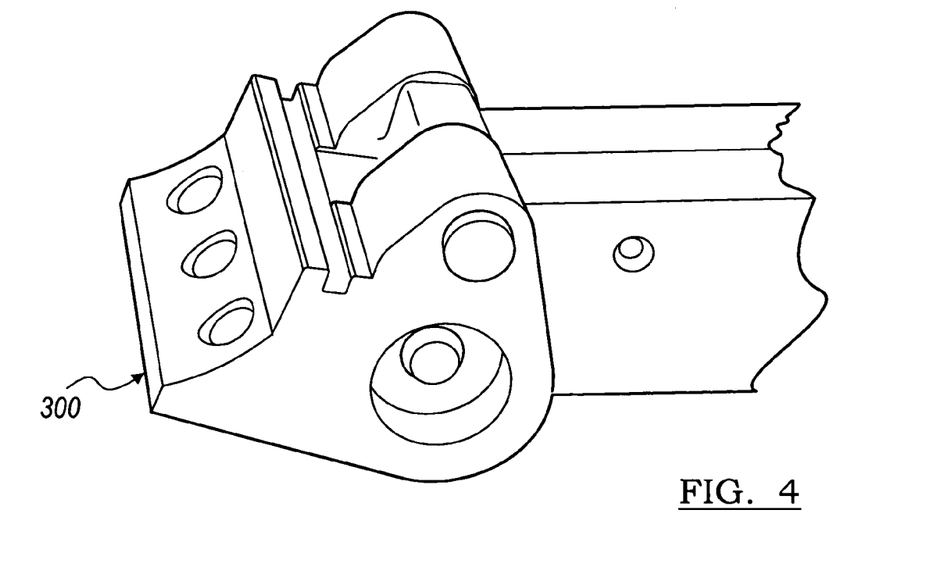
FIG. 4 is a perspective view of one of the pivot bearing members depicted in FIG. 1, in accordance with a fourth embodiment of the present invention.

Referring to FIG. 4, there is shown a perspective view of one of the pivot bearing members 300 depicted in FIG. 1, in accordance with a fourth embodiment of the present invention. The pivot bearing member 300 is operably associated with a portion of at least one of the pivot assemblies 14a, 14b, respectively, and a portion of the running board member 12. It should be appreciated that a pivot bearing member would be operably associated with each of the pivot assemblies 14a, 14b, respectively.

Figure 5:
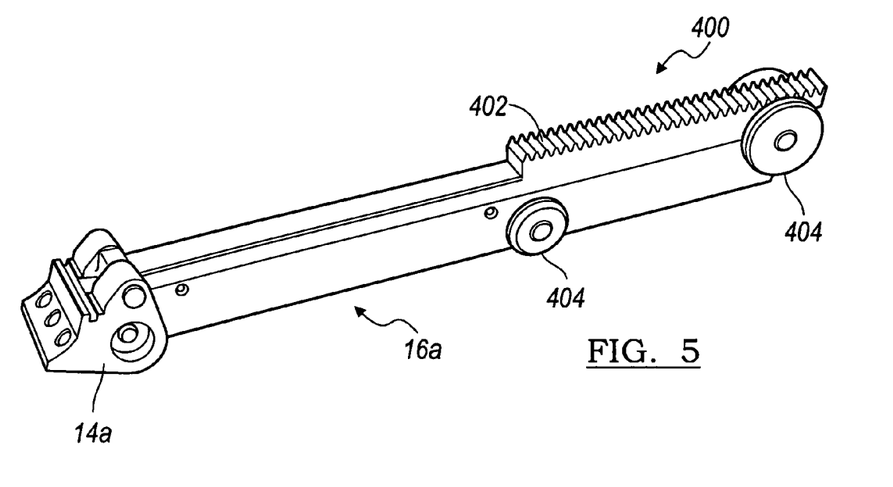
FIG. 5 is a perspective view of one of the arm assemblies depicted in FIG. 1, in accordance with a fifth embodiment of the present invention.

Referring to FIG. 5, there is shown a perspective view of one of the arm assemblies 16a, 16b, respectively, depicted in FIG. 1, in accordance with a fifth embodiment of the present invention. Although a pair of arm assemblies 16a, 16b, respectively, is shown, it should be appreciated that either less than (e.g., a single centrally located arm assembly) or more than this number (e.g., three or more arm assemblies) of arm assemblies, and their associated components, can be used in the practice of the present invention. The arm assembly 16a (as well as arm assembly 16b) includes a rack portion 400 (having a plurality of raised members 402) formed on an inner portion thereof. At least one roller assembly 404 is provided for allowing the arm assemblies 16a, 16b, respectively, to roll, slide or otherwise move relatively easily within the housing 18. One of the pivot assemblies 14a is shown at an end portion of the arm assembly 16a. As previously noted, the pivot assembly 14a (and hence the running board member 12) is operable to pivot relative to the end portion of the arm assembly 16a.

Figure 6:
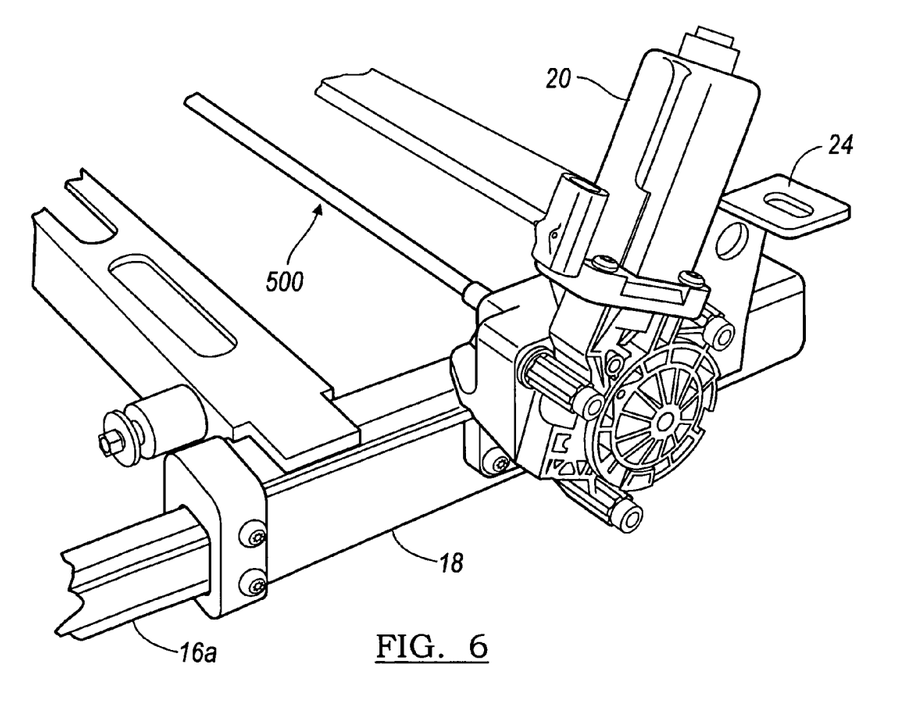
FIG. 6 is a perspective view of the drive shaft member depicted in FIG. 1, in accordance with a sixth embodiment of the present invention.

Referring to FIG. 6, there is shown a perspective view of the drive shaft member 500 depicted in FIG. 1, in accordance with a sixth embodiment of the present invention. The intended function of the drive shaft member 500 is to provide a method of propelling the arm assemblies 16a, 16b, respectively, out of the housing 18 as well as to provide a method of retracting the arm assemblies 16a, 16b, respectively, back into the housing 18. By way of a non-limiting example, the drive shaft member 500 cooperates with a pinion member, to be described herein, that cooperates with the rack portion 400 of the arm assemblies 16a, 16b, respectively. The drive shaft member 500 is actuated by a motor, as will be described herein.

Figure 7:
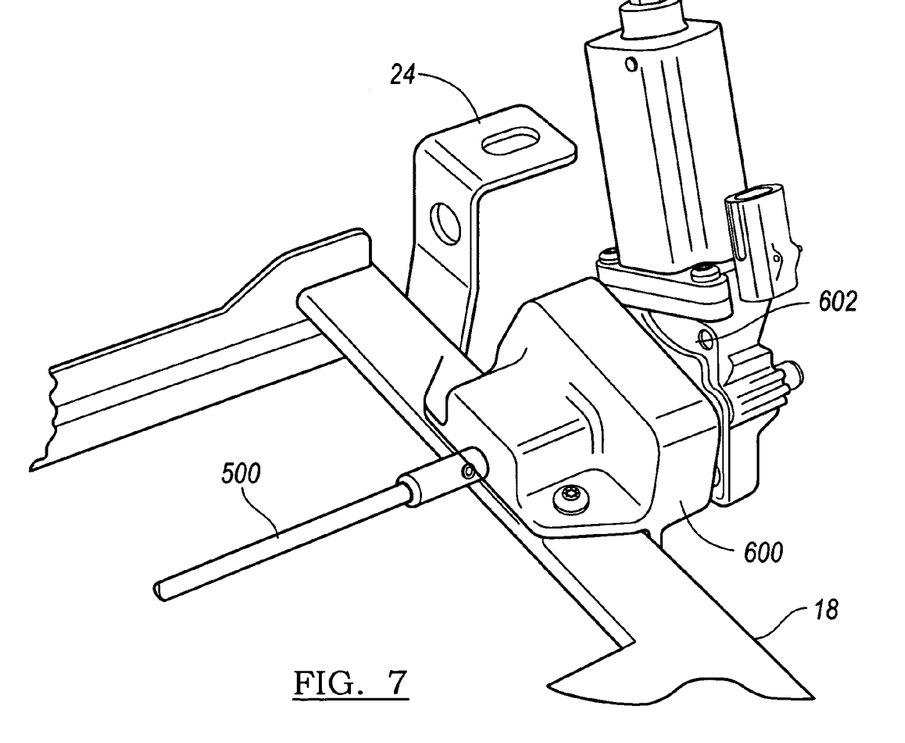
FIG. 7 is a perspective view of the motor drive assembly depicted in FIG. 1, in accordance with a seventh embodiment of the present invention.

Referring to FIG. 7, there is shown a perspective view of the motor drive assembly 600 depicted in FIG. 1, in accordance with a seventh embodiment of the present invention. The motor drive assembly 600 includes a linear motor 602 contained therein that is selectively operable to drive the drive shaft member 500 in a first direction and a second opposite direction so as to permit the arm assemblies 16a, 16b, to be propelled outwardly from the housing 18 and retracted inwardly into the housing 18.

Figure 8:
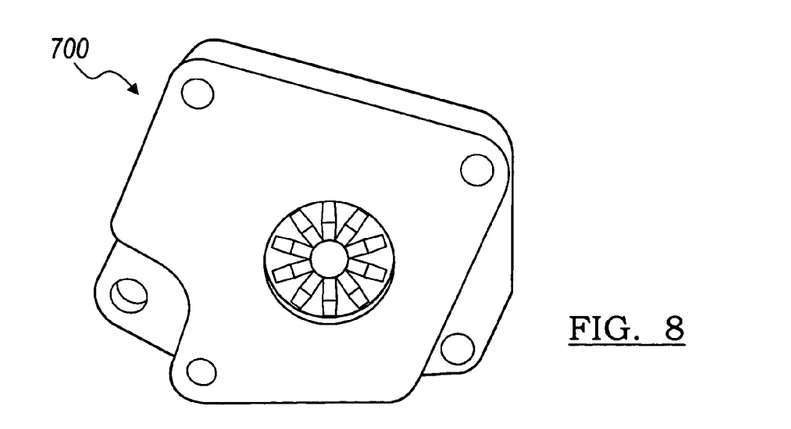
FIG. 8 is a perspective view of the motor connection assembly depicted in FIG. 1, in accordance with an eighth embodiment of the present invention.

Referring to FIG. 8, there is shown a perspective view of the motor connection assembly 700 depicted in FIG. 1, in accordance with an eighth embodiment of the present invention.

Figure 9:
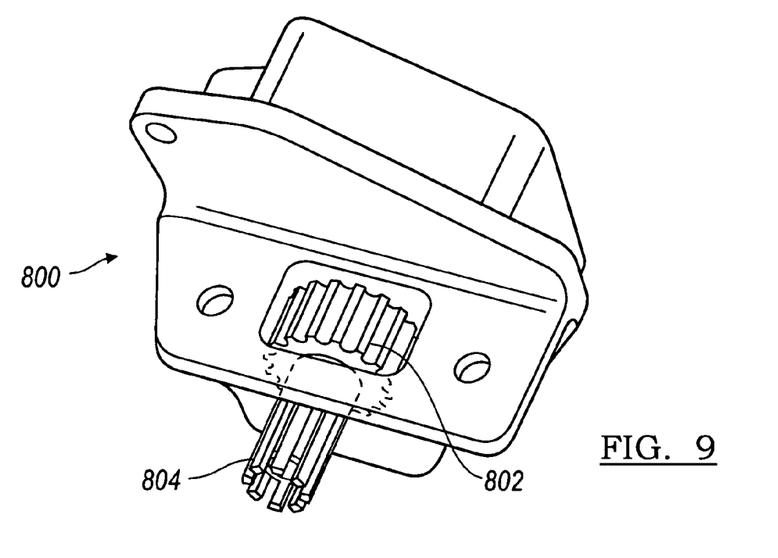
FIG. 9 is a perspective view of the motor mount assembly depicted in FIG. 1, in accordance with a ninth embodiment of the present invention.

Referring to FIG. 9, there is shown a perspective view of the motor mount assembly 800 depicted in FIG. 1, in accordance with a ninth embodiment of the present invention. The motor mount assembly 800 permits the attachment of the motor drive assembly 600 to the housing 18. Additionally, in this view the pinion member 802 is clearly visible, as well as a coupling half 804 for receiving shaft 500 which consists of a shaft member and two mating coupling halves which mate to coupling half 804 at the motor drive end and another spaced and opposed coupling half at the slave drive assembly 28 opposite to the motorized drive assembly 20, as more clearly seen in FIG. 1.

The operation of the system 10 is fairly straightforward. The system 10 can be operated in any number of ways, including by pressing a button (e.g., on the dashboard or a doorframe), actuating a key fob function (e.g., sending a wireless signal to a receiver mounted on the vehicle) and/or the like. Alternatively, the system 10 can be controlled by the vehicle's computer(s), e.g., via one or more motors, so as to automatically deploy and stow the system 10 in accordance with pre-programmed instructions (e.g., opening and closing of a door latch adjacent to the running board assembly).

When it is desired for the system 10 to be deployed, e.g., when a passenger wishes to enter or leave the vehicle, the system 10 is actuated via the motor drive assembly 600, which in turn causes the drive shaft member 500 to rotate in the appropriate direction. Because the pinion member 800 is attached to the drive shaft member 500, it likewise rotates in the same direction. As the pinion member 800 rotates, it causes the rack portion 400 to travel in a first direction, e.g., such that the arm assemblies 16a, 16b, respectively, are propelled outwardly from the housing 18. The pinion member 800 continues to rotate until it reaches the respective end of the rack portion 400. Alternatively, the pinion member 800 can be controlled by a computer to rotate a specific number of rotations, or for a specific time interval, and/or the like. When the arm assemblies 16a, 16b, respectively, are in their fully deployed position, the running board member 12 should be in a substantially horizontal position relative to the ground and the vehicle.

When it is desired to stow the system 10, e.g., when the operator wishes to drive the vehicle, the system 10 is actuated via the motor drive assembly 600, which is turn causes the drive shaft member 500 to rotate in the opposite direction as previously described for the deployment process. Because the pinion member 800 is attached to the drive shaft member 500, it likewise rotates in the same direction. As the pinion member 800 rotates, it causes the rack portion 400 to travel in a second opposite direction as previously described for the deployment process, e.g., such that the arm assemblies 16a, 16b, respectively, are retracted inwardly into the housing 18. The pinion member 800 continues to rotate until it reaches the respective end of the rack portion 400. Alternatively, the pinion member 800 can be controlled by a computer to rotate a specific number of rotations, or for a specific time interval, and/or the like. When the arm assemblies 16a, 16b, respectively, are in or near their fully stowed position, the pivot assemblies 14a, 14b, respectively, are urged upwardly and pivot (e.g., about the rotational connection between arm assemblies 16a, 16b, respectively) so as to cause the running board member 12 to be tilted upwardly (e.g., about 20 degrees from the horizontal or whatever angle of rotation provides the most suitable nesting of the running board assembly to the outer sill sheet metal surfaces). In this manner, the running board member 12 tilts upwardly toward the underbody (e.g., chassis) of the vehicle so as to provide a very low profile appearance.

Figure 10:
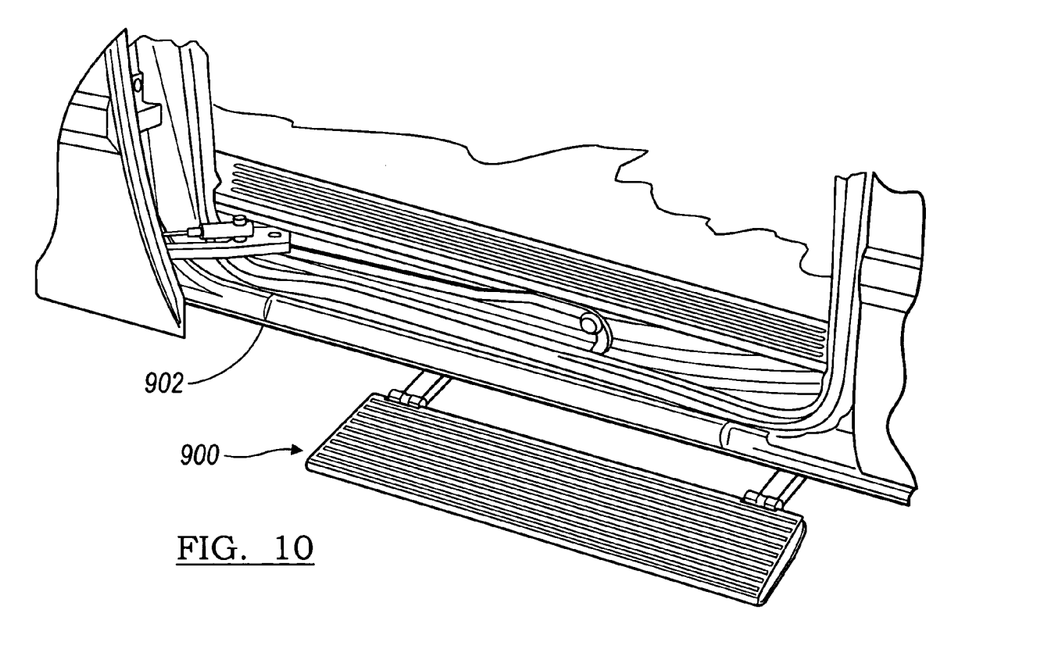
FIG. 10 is a partial perspective view of a deployed running board system mounted to a vehicle, in accordance with a tenth embodiment of the present invention.

Referring to FIG. 10, there is shown a partial perspective view of a deployed running board system 900 mounted to a vehicle 902, in accordance with a tenth embodiment of the present invention. The system 900 is especially suitable for use in applications involving substantially low ground clearance. Although this view shows the system 900 mounted below a side door sill, it should be appreciated that the system 900 can be mounted on any portion or surface of the vehicle.

Figure 11:
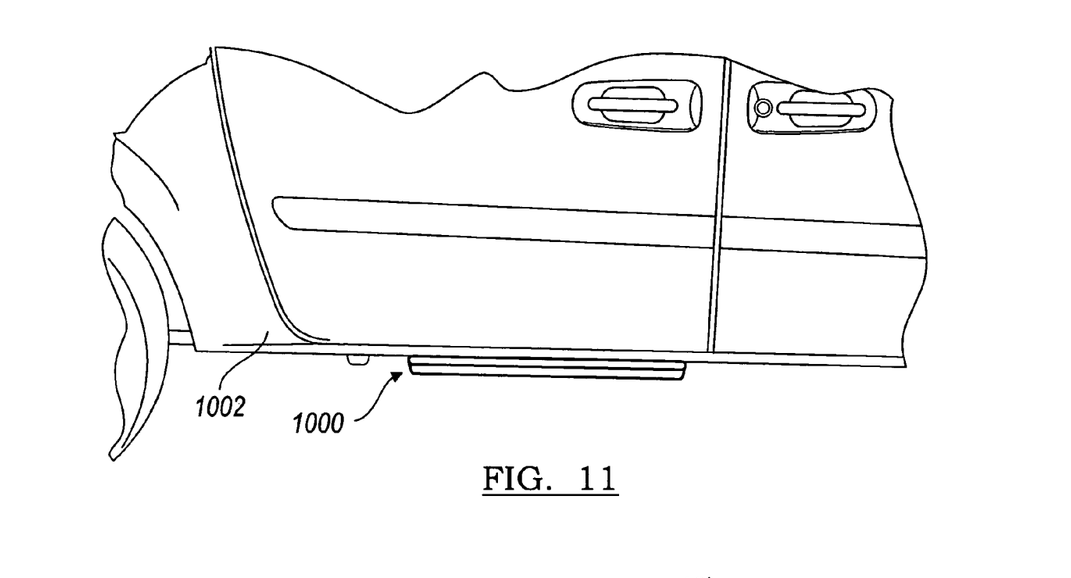
FIG. 11 is a partial elevational view of a stowed running board system mounted to a vehicle, in accordance with an eleventh embodiment of the present invention.
Figure 12:
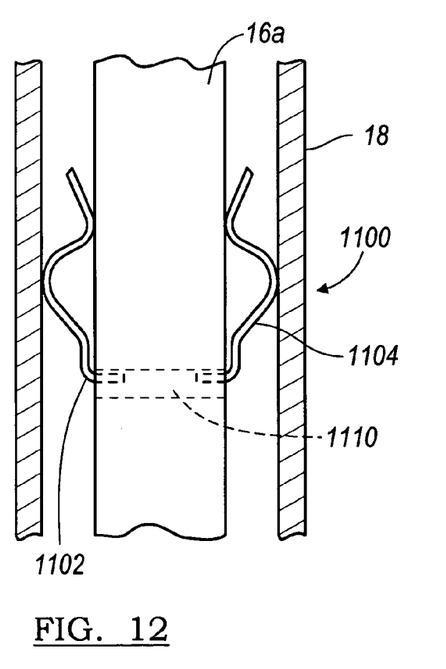
FIG. 12 is a partial plan view of a running board system having a rotational motion control system incorporated therein, in accordance with a twelfth embodiment of the present invention.
Figure 13:
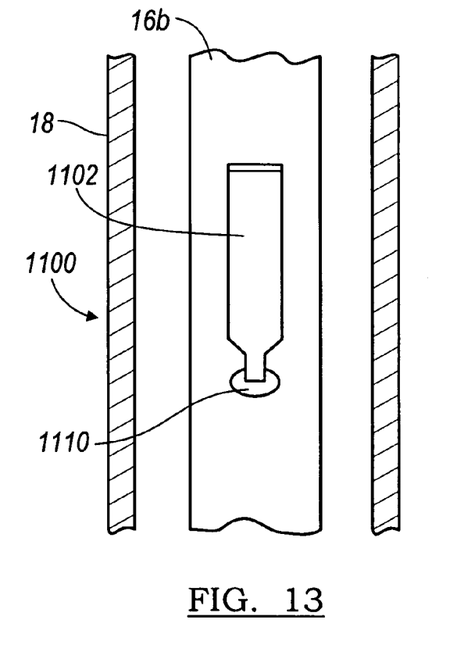
FIG. 13 is a partial side view of the running board system depicted in FIG. 12, in accordance with a twelfth embodiment of the present invention.

Referring to FIG. 11, there is shown a partial elevational view of a stowed running board system 1000 mounted to a vehicle 1002, in accordance with an eleventh embodiment of the present invention. In the stowed position, the system 1000 is quite unnoticeable and does not detract from the aesthetic appearance of the vehicle 1002. The system 1000 is especially suitable for use in applications involving substantially low ground clearance. Although this view shows the system 1000 mounted below a side door sill, it should be appreciated that the system 1000 can be mounted on any portion or surface of the vehicle.

In accordance with another aspect of the present invention, a system 1100 for permitting initial, rather than subsequent, rotational movement of the pivot assemblies 14a, 14b, respectively, during the deploy and stow operations of the running board system of the present invention is shown in FIGS. 12-15. The intended purpose of system 1100 is to provide a controlled rotation operation of the pivot assemblies 14a, 14b/running board member 12 with respect to linear movement of the arm assemblies 16a, 16b, respectively, thus avoiding or at least controlling any potential pinch points associated with the running board system. That is, by operably associating one or more friction members, such as but not limited to leaf springs 1102, 1104, respectively, between the arm assemblies 16a, 16b, respectively, and the inner surface of the housing 18, it forces the rack portion 400 (e.g., via the action of the pinion member 802) to pull (or push) and rotate the running board member 12 (e.g., via pivot assemblies 14a, 14b, respectively) before linear movement, e.g., of the arm assemblies 16a, 16b, respectively, begins. It should be appreciated that other members could be used for the intended purpose of the friction member, such as but not limited to compression members, disc members, plastic compliant members and/or the like.

Although the leaf springs 1102, 1104, are shown as being positioned in the area between the wheel members 1106, 1108, respectively, it should be appreciated that their relative positions can be modified without departing from the scope of the invention. For example, one of the ends of the leaf springs, 1102, 1104, respectively, can be operably associated with an aperture 1110 formed in the surface of the arm assemblies 16a, 16b, respectively, thus ensuring that the leaf springs 1102, 1104, respectively, maintain their relative positions during the deploy/stow operations. As with the previously described embodiments, the operation of the system 1100 can be controlled, electronically or otherwise, with the vehicle's computers and any associated motors, and can be associated with any surface of the vehicle.

Figure 14:
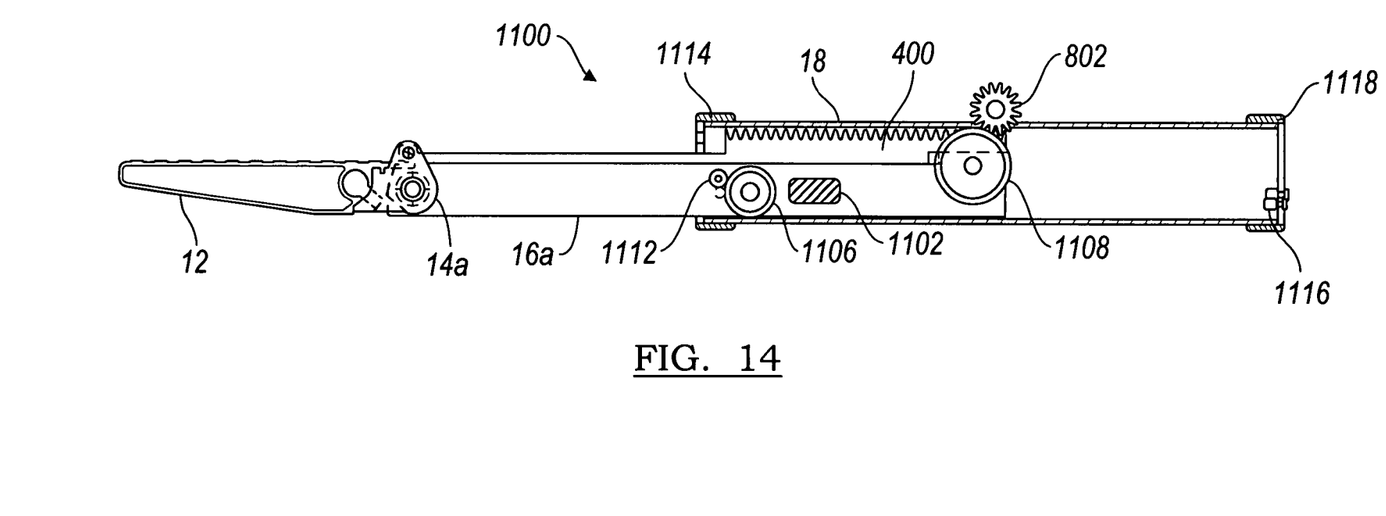
FIG. 14 is a sectional view of the running board system depicted in FIG. 12 in the deployed position, in accordance with a twelfth embodiment of the present invention.

Thus, on the deploy cycle, the running board member 12 rotates in a substantially downward direction to a horizontal or the like position prior to moving in an outboard, e.g., relative to the vehicle, direction, e.g., to assume the position shown in FIG. 14. As can be seen in FIG. 14, further outboard linear movement of the arm assemblies 16a, 16b, respectively, are limited by at least one deploy stop bumper 1112 and outer end cap member 1114.

Figure 15:
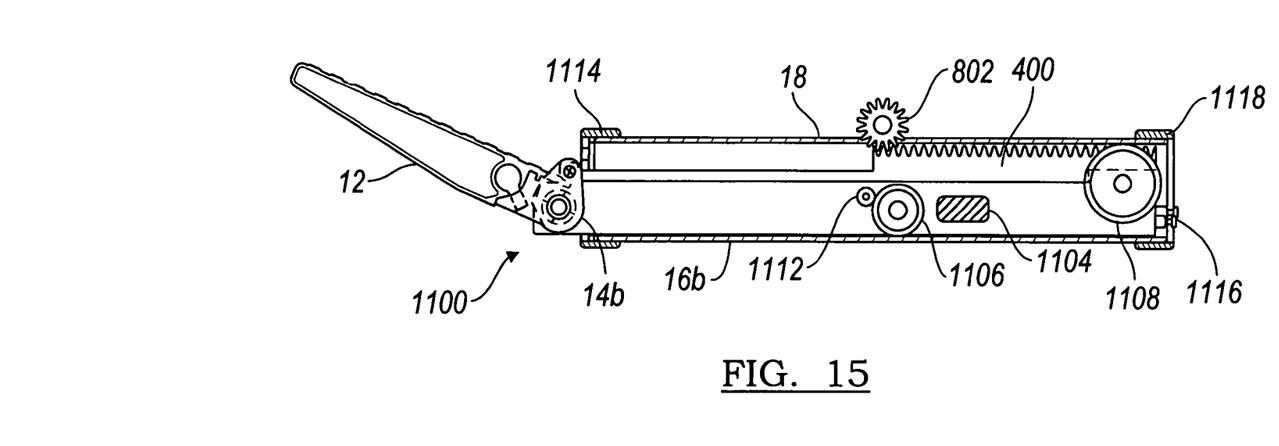
FIG. 15 is a sectional view of the running board system depicted in FIG. 12 in the stowed position, in accordance with a twelfth embodiment of the present invention.

On the stow cycle, the running board member 12 rotates in a substantially upward direction to a vertical or the like (e.g., slightly risen up) position prior to moving in an inboard, e.g., relative to the vehicle, direction, e.g., to assume the position shown in FIG. 15. As can be seen in FIG. 15, further inboard linear movement of the arm assemblies 16a, 16b, respectively, are limited by at least one stow stop bumper 1116 and inner end cap member 1118. Thus, the system 1100 reduces any pinching effect to the rocker area of the vehicle and makes it easier to control pinch points electronically by eliminating the scissor effect created by the rotational action of the running board member 12 adjacent to the vehicle's sill in the near deployed position by a more easily controlled linear movement as is common in automotive anti-pinch methods via electronically sensing motor current profiles.

It should be appreciated that any of the features and characteristics of the various aforementioned embodiments can be used in conjunction with one another in any number of combinations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A selectively automated running board system that is deployable and stowable, comprising:
   a running board member;
   a pivot member operably associated with a surface of the running board member;
   an arm member operably associated with a surface of the pivot member, and
   a motion system operable to impart linear movement to the arm member;
   wherein the linear movement of the arm member is operable to impart rotational movement to the pivot member, the rotational movement of the pivot member occurring either before the linear movement of the arm member begins or after the linear movement of the arm member is completed.

2. The invention according to claim 1, further comprising a sleeve member at least partially enveloping a portion of the arm member.

3. The invention according to claim 2, further comprising a friction member disposed between the arm member and the sleeve member.

4. The invention according to claim 3, wherein the friction member is fixed in place relative to the arm member.

5. The invention according to claim 3, wherein the friction member comprises a leaf spring.

6. The invention according to claim 1, further comprising a first stop member for preventing linear movement of the arm member in a first direction.

7. The invention according to claim 6, further comprising a second stop member for preventing linear movement of the arm member in a second direction.

8. The invention according to claim 1, wherein the running board member is deployed when the arm member travels in a first linear direction.

9. The invention according to claim 8, wherein the running board member is stowed when the arm member travels in a second linear direction.

10. The invention according to claim 1, wherein the linear movement of the arm member is either inboard or outboard relative to a vehicle.

11. The invention according to claim 1, wherein the running board system is operably associated with a surface of a vehicle.

12. The invention according to claim 1, wherein the motion system comprises a rack and pinion system.

13. The invention according to claim 1, wherein the pivot member is operable to cause the running board member to pivot in a downward direction at the beginning of a deploying operation of the running board system.

14. The invention according to claim 1, wherein the pivot member is operable to cause the running board member to pivot in an upward direction at the beginning of a stowing operation of the running board system.

15. A selectively automated running board system that is deployable and stowable, comprising:
   a running board member;
   a pivot member operably associated with a surface of the running board member;
   an arm member operated associated with a surface of the pivot member; and
   a rack and pinion system operable to impart linear inboard and outboard movement to the arm member;
   wherein the linear inboard or outboard movement of the arm member is operable to impart rotational movement to the pivot member, the rotational movement of the pivot member occurring either before the linear movement of the arm member begins or after the linear movement of the arm member is completed.

16. The invention according to claim 15, further comprising a sleeve member at least partially enveloping a portion of the arm member.

17. The invention according to claim 16, further comprising a friction member disposed between the arm member and the sleeve member.

18. The invention according to claim 17, wherein the friction member is fixed in place relative to the arm member.

19. The invention according to claim 17, wherein the friction member comprises a leaf spring.

20. The invention according to claim 15, further comprising a first stop member for preventing linear movement of the arm member in a first direction.

21. The invention according to claim 20, further comprising a second stop member for preventing linear movement of the arm member in a second direction.

22. The invention according to claim 15, wherein the running board member is deployed when the arm member travels in a first linear direction.

23. The invention according to claim 22, wherein the running board member is stowed when the arm member travels in a second linear direction.

24. The invention according to claim 15, wherein the linear movement of the arm member is either inboard or outboard relative to a vehicle.

25. The invention according to claim 15, wherein the running board system is operably associated with a surface of a vehicle.

26. The invention according to claim 15, wherein the pivot member is operable to cause the running board member to pivot in a downward direction at the beginning of a deploying operation of the running board system.

27. The invention according to claim 15, wherein the pivot member is operable to cause the running board member to pivot in an upward direction at the beginning of a stowing operation of the running board system.

28. A selectively automated running board system that is deployable and stowable, comprising:
   a running board member;
   a pivot member operably associated with a surface of the running board member;
   an arm member operably associated with a surface of the pivot member;
   a sleeve member at least partially enveloping a portion of the arm member;
   a friction member disposed between the arm member and the sleeve member; and
   a motion system operable to impart linear movement to the arm member;
   wherein the friction member is operable to impart rotational movement to the pivot member, the rotational movement of the pivot member occurring either before the linear movement of the arm member begins or after the linear movement of the arm member is completed.

29. The invention according to claim 28, wherein the friction member is fixed in place relative to the arm member.

30. The invention according to claim 28, wherein the friction member comprises a leaf spring.

31. The invention according to claim 28, further comprising a first stop member for preventing linear movement of the arm member in a first direction.

32. The invention according to claim 31, further comprising a second stop member for preventing linear movement of the arm member in a second direction.

33. The invention according to claim 28, wherein the running board member is deployed when the arm member travels in a first linear direction.

34. The invention according to claim 33, wherein the running board member is stowed when the arm member travels in a second linear direction.

35. The invention according to claim 28, wherein the linear movement of the arm member is either inboard or outboard relative to a vehicle.

36. The invention according to claim 28, wherein the running board system is operably associated with a surface of a vehicle.

37. The invention according to claim 28, wherein the motion system comprises a rack and pinion system.

38. The invention according to claim 28, wherein the pivot member is operable to cause the running board member to pivot in a downward direction at the beginning of a deploying operation of the running board system.

39. The invention according to claim 28, wherein the pivot member is operable to cause the running board member to pivot in an upward direction at the beginning of a stowing operation of the running board system.

* * * * *